United States Patent [19]
Virkar et al.

[11] Patent Number: 6,054,231
[45] Date of Patent: Apr. 25, 2000

[54] SOLID OXIDE FUEL CELL INTERCONNECTOR

[75] Inventors: Anil V. Virkar, Salt Lake City; Diane M. England, Murray, both of Utah

[73] Assignee: Gas Research Institute, Chicago, Ill.

[21] Appl. No.: 09/122,287

[22] Filed: Jul. 24, 1998

[51] Int. Cl.[7] ................................... H01M 8/10
[52] U.S. Cl. ................... 429/34; 429/30; 429/38
[58] Field of Search ................... 429/30, 34, 38

[56] References Cited

U.S. PATENT DOCUMENTS

| | | | |
|---|---|---|---|
| Re. 34,213 | 4/1993 | Hsu | 204/258 |
| 3,785,867 | 1/1974 | Edwards et al. | 136/36 |
| 4,225,654 | 9/1980 | Tajima et al. | 429/34 |
| 4,514,475 | 4/1985 | Mientek | 429/35 |
| 4,555,453 | 11/1985 | Appleby | 429/41 |
| 4,761,349 | 8/1988 | McPheeters et al. | 429/39 |
| 4,874,678 | 10/1989 | Reichner | 429/30 |
| 4,888,254 | 12/1989 | Reichner | 429/31 |
| 4,950,562 | 8/1990 | Yoshida et al. | 429/32 |
| 4,997,727 | 3/1991 | Bossel | 429/33 |
| 5,034,288 | 7/1991 | Bossel | 429/32 |
| 5,049,456 | 9/1991 | Matsuhiro et al. | 429/12 |
| 5,085,950 | 2/1992 | Primdahl | 429/30 |
| 5,185,219 | 2/1993 | Ishihara et al. | 429/31 |
| 5,238,754 | 8/1993 | Yasuo et al. | 429/30 |
| 5,258,240 | 11/1993 | Di Croce et al. | 429/31 |
| 5,273,838 | 12/1993 | Draper et al. | 429/31 |
| 5,292,600 | 3/1994 | Kaufman | 429/39 |
| 5,298,342 | 3/1994 | Laurens et al. | 429/35 |
| 5,411,767 | 5/1995 | Soma et al. | 429/453 |
| 5,445,904 | 8/1995 | Kaufman | 429/34 |
| 5,480,739 | 1/1996 | Kawasaki et al. | 429/33 |
| 5,496,655 | 3/1996 | Lessing | 429/34 |
| 5,942,349 | 8/1999 | Badwal et al. | 429/34 |

*Primary Examiner*—Maria Nuzzolillo
*Assistant Examiner*—Monique M. Wills
*Attorney, Agent, or Firm*—Pauley Petersen Kinne & Fejer

[57] ABSTRACT

A solid oxide fuel cell interconnector having a superalloy metallic layer with an anode facing face and a cathode facing face and a metal layer on the anode facing face of the superalloy metallic layer, the metal layer including a metal which reacts with $Cr_2O_3$ to form an electronically conducting oxide phase on the superalloy metallic layer. In accordance with one particularly preferred embodiment, a second metal layer is disposed between the metal layer and the superalloy metallic layer, the second metal layer including a metal which does not oxidize in a fuel atmosphere.

22 Claims, 5 Drawing Sheets

SOLID OXIDE FUEL CELL INTERCONNECTOR

BACKGROUND OF THE INVENTION

1. Field of the Invention

This invention relates to solid oxide fuel cells, in particular, interconnectors comprising a superalloy metallic layer and a metal layer, which metal layer protects the superalloy metallic layer against increases in electrical resistivity in the fuel environment of the anode facing face of the interconnector due to the formation of chromia ($Cr_2O_3$). In particular, the metal layer comprises a metal which reacts with chromia to form an oxide phase on the superalloy metallic layer.

2. Description of Prior Art

It is well known that nickel is perfectly satisfactory as a constituent of an anode electrode in solid oxide fuel cells in which hydrogen, as well as reformed methane, is used as a fuel. It can readily be shown that, on the one hand, in the fuel atmosphere at the anode electrode, neither nickel oxide nor nickel carbide can form. On the other hand, most superalloys, that is alloys which are resistant to oxidation at high temperatures, such as austenitic stainless steel and INCONEL™, contain a significant amount of chromium. The partial pressure of oxygen at the anode electrode is usually high enough to form chromium oxide or chromia ($Cr_2O_3$). Although chromium oxide (chromia) scale does not grow rapidly, its resistance is rather high and, thus, it is desirable that its thickness be as small as possible. In our work on fuel cell stack testing, we have observed that the oxide coating is usually thicker on the fuel side (anode side) than on the air side (cathode side) of the interconnector between cell units. We believe that this may be due to the fact that water formed by the electrochemical reaction of fuel and oxygen adversely affects the kinetics of oxide growth. We have, in fact, observed in our work that the resistance of the interconnector on the fuel side is actually greater than the resistance on the air side, both immediately after testing and at room temperature. The solid oxide fuel cell interconnectors of this invention address this issue by preventing an increase in the net interconnector resistance through the formation of an electronically conducting oxide phase on the fuel side of the interconnector.

Solid oxide fuel cells, like other fuel cells, comprise an anode electrode, a cathode electrode, and an electrolyte disposed between the anode electrode and the cathode electrode. In contrast to other types of fuel cells, for example, molten carbonate fuel cells, solid oxide fuel cells operate at relatively high temperatures, typically greater than about 800° C. Accordingly, the interconnector materials must be able to withstand such temperatures.

One solution to the problem of metallic interconnector oxidation in solid oxide fuel cells is taught, for example, by U.S. Pat. No. 4,950,562 which teaches a solid electrolyte type of fuel cell having an interconnector comprising a heat resistant alloy substrate coated on its surface with a composite metal oxide of the perovskite-type structure, that is $La_{1-x}M^1_xM^2O_3$ wherein $M^1$ is an alkaline earth metal, $M^2$ is Co, Fe, Mn, Ni, or Cr and x is greater than or equal to zero and less than 1. U.S. Pat. No. 5,411,767 teaches a method for producing interconnectors for electrically connecting unit cells of a solid electrolyte type fuel cell in which the interconnector material, a perovskite-complexed oxide, is thermally sprayed onto the surface of an electrode of a solid electrolyte type fuel cell by plasma thermal spraying. An interconnector made of lanthanum chromite or lanthanum oxide and chromium oxide doped with copper, zinc, calcium or strontium for a solid oxide fuel cell is taught by U.S. Pat. No. 5,480,739. See also U.S. Pat. No. 4,874,678 and U.S. Pat. No. 4,888,254, both of which teach interconnects of lanthanum chromite doped with calcium, strontium, or magnesium for use in connection with solid oxide electrolyte fuel cell stacks; U.S. Pat. No. 5,034,288 which teaches a solid electrolyte fuel cell stack comprising a metallic bipolar plate comprising a nickel-based alloy and coated on the oxygen side with a lanthanum/manganese perovskite applied by plasma spraying; U.S. Pat. No. 4,997,727 which teaches an interconnect for a solid electrolyte fuel cell stack constructed of INCONEL™ X; and U.S. Pat. No. 5,496,655 which teaches a bipolar interconnector manufactured from NiAl or $Ni^3Al$ coated with strontium or calcium-doped lanthanum chromite.

In contrast thereto, the interconnects for solid oxide fuel cells in accordance with this invention are substantially lower in cost while providing high conductivity relative to other known interconnects.

SUMMARY OF THE INVENTION

It is an object of this invention to provide a solid oxide fuel cell which utilizes a heat-resistant, electrically conductive part suitable for use as an interconnector between adjacent fuel cell units in a fuel cell stack.

It is another object of this invention to provide an interconnector for a solid oxide fuel cell stack which substantially avoids the formation of surface oxides on the fuel side of the interconnectors.

It is yet another object of this invention to provide a solid oxide fuel cell interconnector which promotes the formation of an oxide phase on the fuel side of the interconnector.

When HAYNES™ 230 alloy is heated in air, it is observed that manganese chromite ($Mn_{1.5}Cr_{1.5}O_4$) forms on the surface of the alloy. Experimentally, it has been observed that HAYNES™ 230 alloy exhibits a low resistance in air. HAYNES™ 230 also has one of the highest concentrations of manganese compared to many other superalloys. However, the concentration of manganese is still much less than chromium. When exposed to wet hydrogen at high temperatures (about 800° C.), chromium oxide ($Cr_2O_3$) readily forms. We have found that electrical resistivity of $Mn_{1.5}Cr_{1.5}O_4$ is lower than that of $Cr_2O_3$. Thus, the preferred oxide phase on the alloy surface is $Mn_{1.5}Cr_{1.5}O_4$. In order to facilitate the formation of $Mn_{1.5}Cr_{1.5}O_4$, we increase the concentration of Mn in the near surface regions. This is, in principle, accomplished by depositing a thin layer of Mn on the superalloy of interest. Although the invention described herein is described in terms of the use of manganese for formation of an oxide phase on the alloy surface, any metal which is capable of producing an electronically conducting oxide phase on the alloy surface is suitable for use in the interconnector of this invention.

Accordingly, the objects of this invention are achieved by a solid oxide fuel cell stack comprising a plurality of fuel cell units, each said fuel cell unit comprising an anode, a cathode, and an electrolyte separating the anode from the cathode, and an interconnect structure (interconnector) separating the anode of one of the fuel cell units from the cathode of an adjacent fuel cell unit. The interconnect structure in accordance with this invention comprises a superalloy metallic layer and a metal layer, the metal layer being disposed on an anode facing face of the superalloy layer and comprising a metal which reacts in the atmosphere of the anode side of the interconnect structure with $Cr_2O_3$ to form an oxide phase on the superalloy metallic layer. Such metals are preferably selected from the group consisting of manganese, magnesium, and zinc.

In accordance with one particularly preferred embodiment of this invention, the interconnect structure further comprises a second metal layer disposed between the metal layer and the superalloy metallic layer where the second metal layer comprises an additional metal which does not oxidize in the atmosphere of the anode side of the interconnect structure. Such additional metals are preferably selected from the group consisting of copper, iron, nickel, silver, gold, platinum, palladium, iridium, and rhodium.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
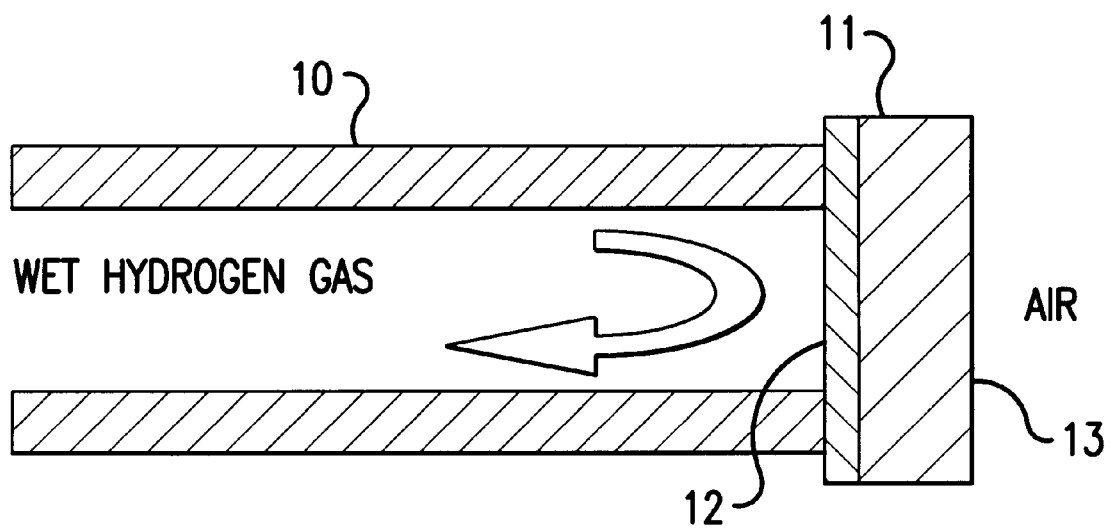
FIG. 1 is a schematic diagram of an apparatus used for testing the interconnect structure of this invention.

The requirements for an interconnect structure for a solid electrolyte type of fuel cell include stability in an oxidizing and reducing atmosphere at high temperatures, good electrical conductivity in an oxidizing and reducing atmosphere at high temperatures, a coefficient of thermal expansion close to that of an oxide ion conductive solid, and a coefficient of thermal expansion close to that of an electrode material. By high temperature, we mean temperatures at least as high as about 700° C.

Until now, metals or electrically conductive ceramics have been used for interconnect structures in solid electrolyte fuel cells. However, when metallic interconnect structures are used at temperatures of 600° C. or higher, oxides are formed on their surfaces, giving rise to considerably increased contact resistance and, thus, increased power losses due to resistance, resulting in deterioration of the fuel cell characteristics. Electrically conductive ceramics which satisfy the requirements for an interconnect structure for solid electrolyte type fuel cells are perovskite-type oxides having the formulation $La_{1-x}M^1_xM^2O_3$ wherein $M^1$ is Sr, Ca, or Ba and $M^2$ is Co, Fe, Mn, Ni, or Cr. Unfortunately, although some of these ceramics are electrically conductive, their electrical resistance is higher than metals and, thus, they are not ideal. In addition, such ceramic interconnect structures are brittle, requiring extra machining in order to provide the requisite surface matings with other fuel cell components; and they are unable to withstand significant thermal shock. As a result, metallic interconnect structures which are flexible and which are able to withstand thermal shock are preferred.

As previously stated, metallic interconnect structures suitable for use in solid oxide fuel cells must be able to withstand temperatures at least as high as about 700° C. for extended periods of time, preferably corresponding to the service life of the fuel cell. More particularly, the metallic interconnect structures for a solid oxide fuel cell stack must be able to withstand temperatures at least as high as about 700° C. for at least 5,000 hours and preferably greater. Metals that satisfy these criteria which, thus, are suitable for use as interconnect structures in solid oxide fuel cells are superalloys, that is, metal alloys typically comprising iron, nickel, chromium, and manganese. Such superalloys include austenitic stainless steels, INCONELS™, HAYNES™ alloys, and HASTELLOYS™. However, when exposed to the fuel atmosphere of a solid oxide fuel cell, the chromium in such superalloys oxidizes, forming $Cr_2O_3$ scale on the interconnect structure surface, thereby increasing the resistance through the interconnect structure.

As previously stated, we have found that when HAYNES™ 230 alloy is heated in air, manganese chromite forms on the surface. Experimentally, we have also observed that HAYNES™ 230 exhibits the lowest resistance of these superalloys. HAYNES™ 230 also has one of the highest concentrations of manganese compared to many other superalloys, although the concentration of manganese is still much less than chromium. Accordingly, we have found that by applying a layer of a metal, such as manganese, to a superalloy interconnect structure on a side of the superalloy interconnect structure facing the anode of a fuel cell, an oxide phase, such as manganese chromite, is formed on the alloy surface. The electrical resistivity of manganese chromite thus formed is lower than that of chromate. In particular, the interconnect structure for a solid oxide fuel cell stack in accordance with this invention comprises a superalloy metallic layer having an anode facing face and a cathode facing face and a metal layer on the anode facing face of the superalloy metallic layer, which metal layer comprises a metal which reacts with chromia to form an oxide phase on the superalloy metallic layer. In accordance with a particularly preferred embodiment of this invention, the metal is selected from the group consisting of manganese, magnesium, and zinc. The superalloy is preferably selected from the group consisting of austenitic stainless steel, INCONELS™, HASTELLOYS™, and HAYNES™ alloys. The metal layer is sufficiently thick so as to prevent metallic interdiffusion under cell operating conditions and, preferably, has a thickness in a range of about 5 Å to about 10 microns. The metal layer can be deposited onto the interconnect structure in any number of ways including electroplating, electroless plating, and sputtering. It is also possible to hot roll foils of the metal and superalloy.

EXAMPLE

A HAYNES™ 230 alloy foil of 4 mil thickness was coated on one side with manganese using a vacuum evaporator. The thickness of the manganese layer was in the range of about 100 to 1,000 Å. A schematic diagram of the apparatus used for oxidizing the foil is shown in FIG. 1. The apparatus consists of an INCONEL™ tube 10 at one end of which is affixed the manganese-coated foil 11 using a metallic gasket. The manganese-coated side 12 is on the inside of the tube and the uncoated side 13 is exposed to air. Wet hydrogen, bubbled through water at room temperature, was circulated inside the tube. At 800° C., the estimated partial pressure of oxygen is about $3 \times 10^{-21}$ atmospheres, which is greater than that required for the oxidation of manganese and chromium, but less than that required for the oxidation of nickel. The test was run for 100 hours. After the test, the foil was removed from the apparatus. An x-ray defraction trace (XRD) with CuKα radiation was obtained from the coated side, that is, the side exposed to hydrogen. In addition, the electrical resistivity of the sample through the coated surface was measured between room temperature and 800° C. For comparison, tests were also performed on Ni-coated foil, the coating having been carried out by electroplating, exposed to wet hydrogen, as well as an uncoated foil, both for 100 hours. These foils were also subjected to the same characterization tests.

Figure 2:
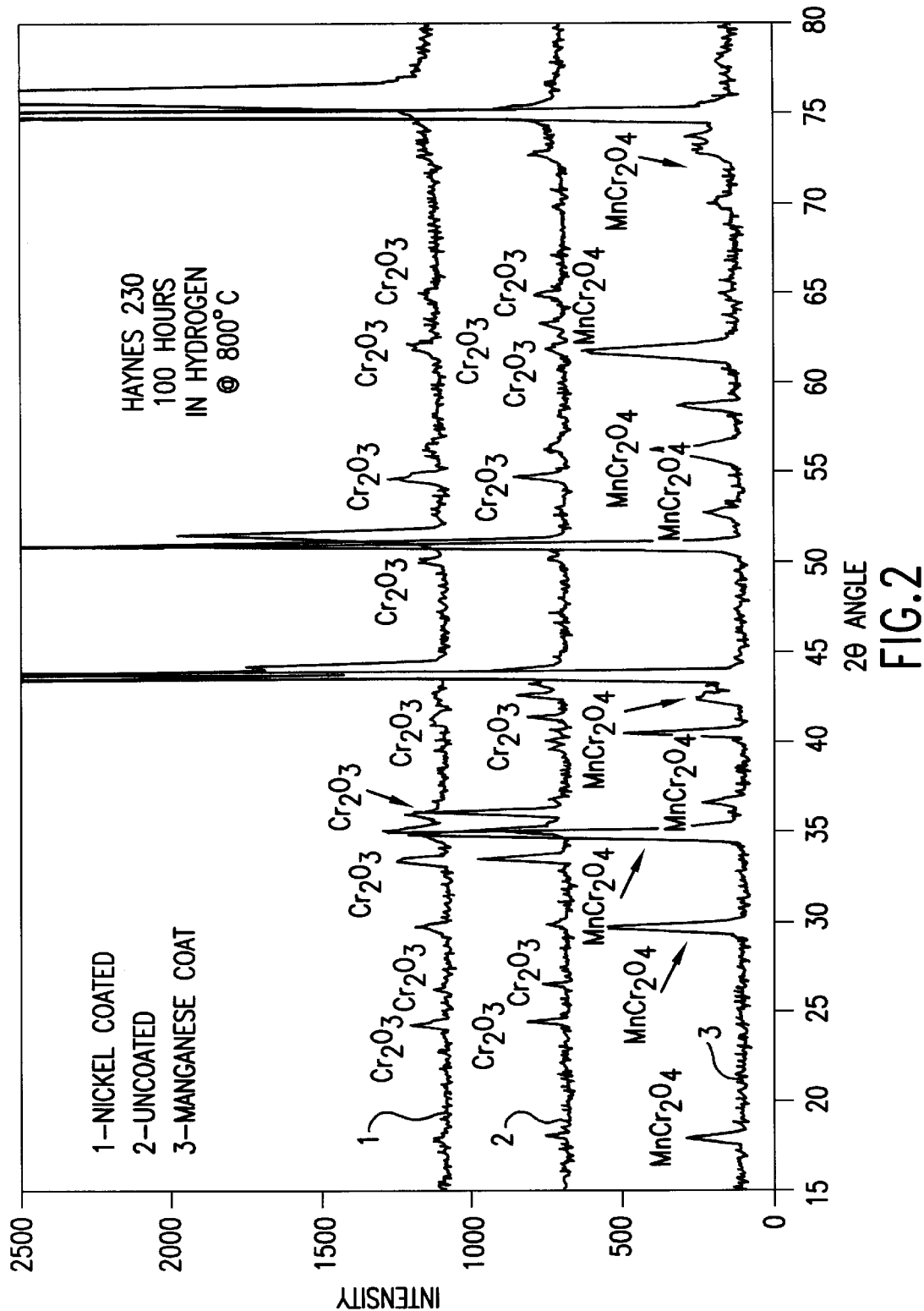
FIG. 2 is a diagram showing x-ray defraction (XRD) traces of three interconnect structures, Mn-coated, Ni-coated, and uncoated, from the side of the interconnect exposed to wet hydrogen.

FIG. 2 shows XRD traces of the three foils from the side exposed to wet hydrogen. Comparison of the uncoated and Ni-coated samples shows that the oxide formed is predominately chromia. However, the amount of chromia formed on the Ni-coated sample appears to be smaller in amount. By contrast, no chromia is observed on the sample coated with manganese. The oxide phase is formed of predominately manganese chromite ($MnCr_2O_4$) with a minor amount of MnO.

Figure 3:
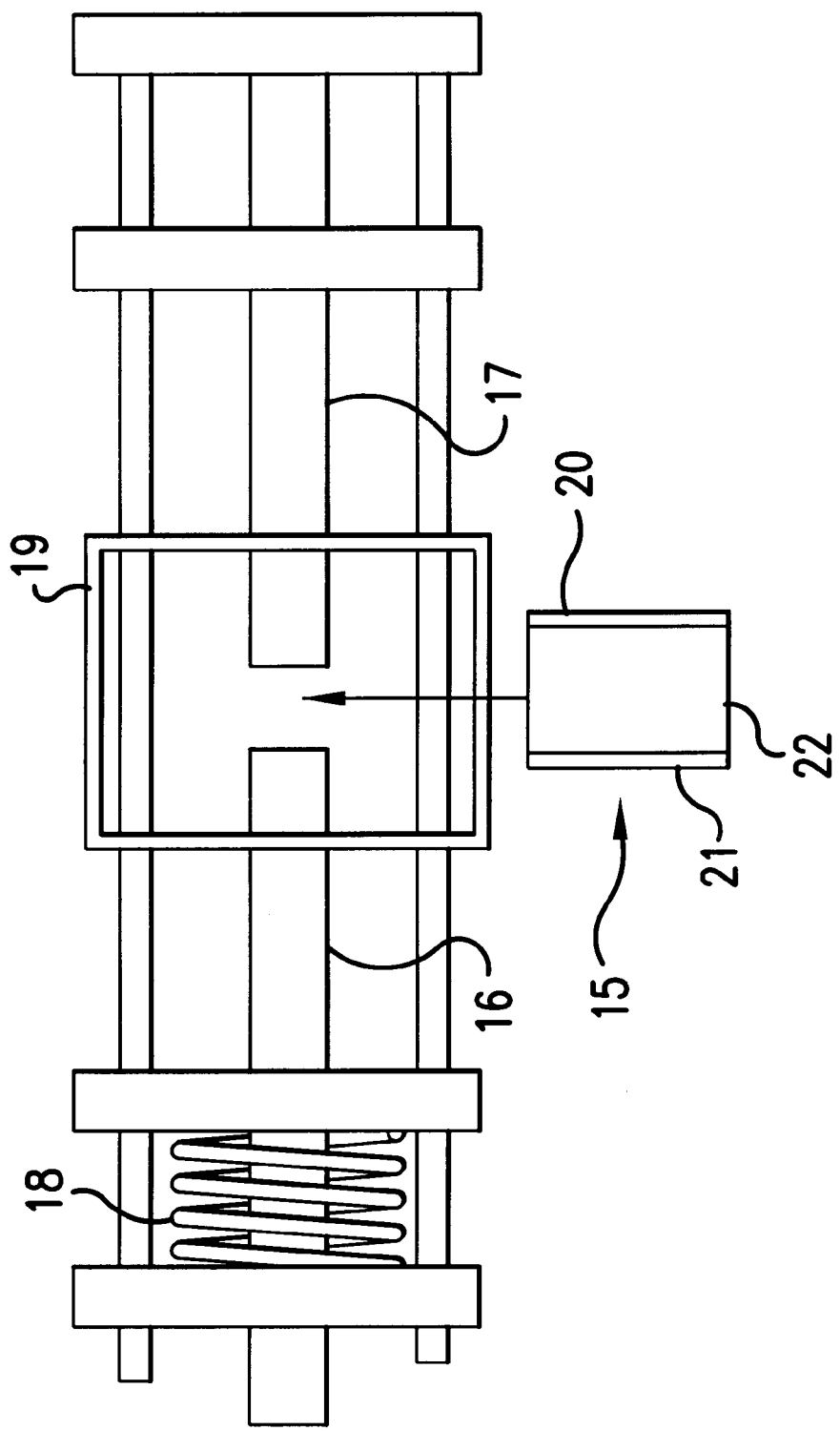
FIG. 3 is a schematic diagram showing an apparatus used for measuring the resistance of interconnect samples through an oxide coating.
Figure 4:
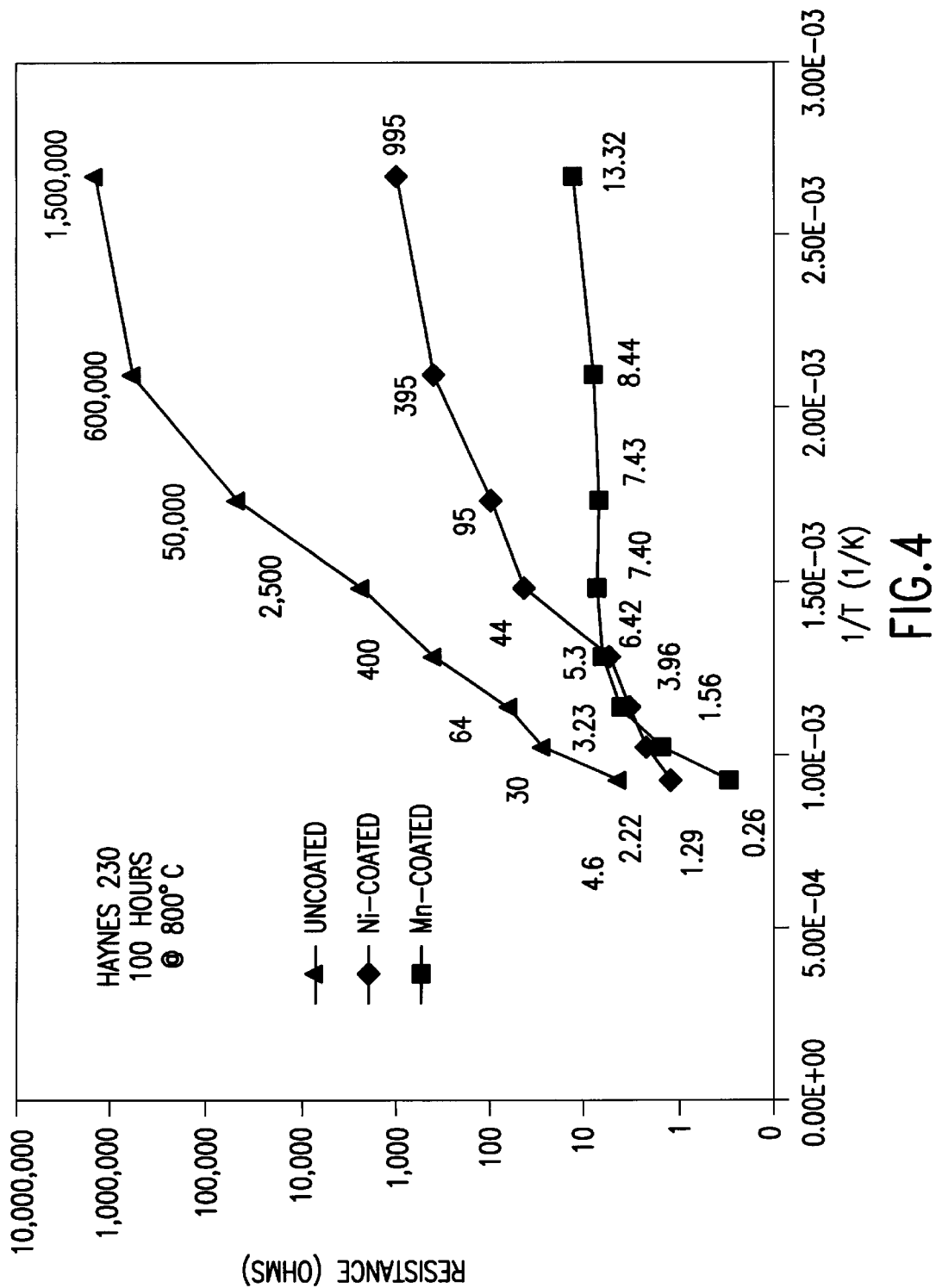
FIG. 4 is a diagram showing the resistance of an interconnect structure in accordance with this invention compared to Ni-coated and uncoated interconnect structures.

The apparatus shown in FIG. 3 is used to measure the resistance of the samples through the oxide coating. Because the objective is to measure the resistance of the oxide scale formed in contact with wet hydrogen, the oxide scale formed on the air side, which is very small, was removed by grinding it off. The sample 15 with oxide layer 20 on superalloy 22 was secured between two alumina rods 16, 17 and compression-loaded using a spring 18 which was outside the hot zone. The sample 15 was heated in air in furnace 19 to temperatures as high as 800° C. and the resistance at the temperature was measured. FIG. 4 shows the measured resistance versus inverse temperature (1/T) where T is in degrees Kelvin. The lowest value of 1/T is $9.32 \times 10^{-4}$ corresponding to 1,073° K (800° C.). FIG. 4 shows that the manganese-coated sample had the lowest resistance while the uncoated sample had the highest resistance, with the Ni-coated sample having the intermediate value.

Figure 5:
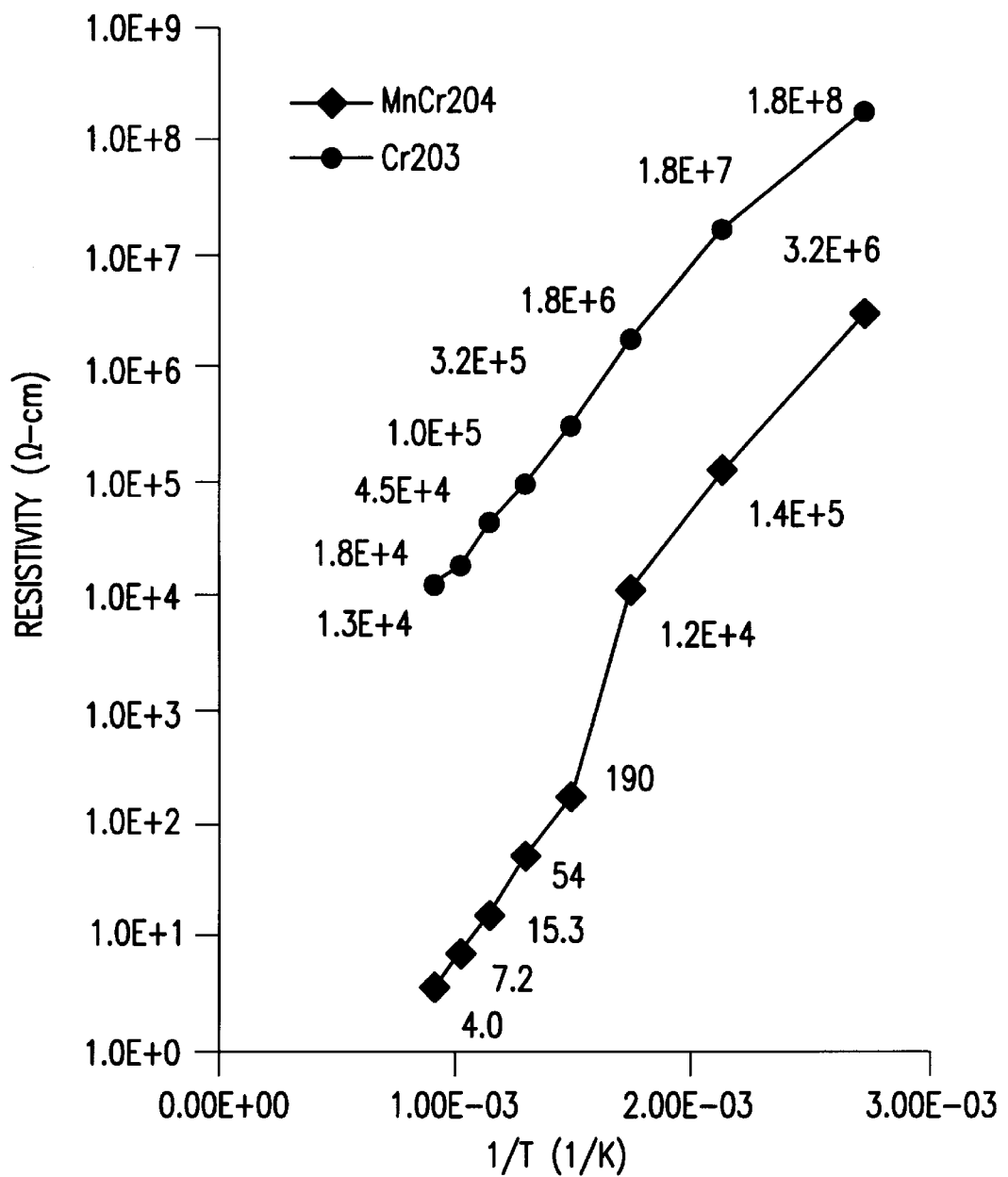
FIG. 5 is a diagram comparing the measured resistivity of a $Mn_{1.5}Cr_{1.5}O_4$ pellet with literature data on $Cr_2O_3$.

The low resistance of the Mn-coated sample is attributable to the formation of $Mn_{1.5}Cr_{1.5}O_4$. In order to confirm this result, a pellet of $Mn_{1.5}Cr_{1.5}O_4$ was prepared by calcining a mixture of MnO and $Cr_2O_3$, and sintering a powder compact of the calcined powder at 1,600° C. We observed $Mn_{1.5}Cr_{1.5}O_4$ is very difficult to sinter, even at 1,600° C. The pellet had satisfactory density and strength so that it could be handled without crumbling. Its electrical resistance was measured over a range of temperatures between room temperature and 800° C. FIG. 5 shows the measured resistivity on a $Mn_{1.5}Cr_{1.5}O_4$ pellet compared to literature data on $Cr_2O_3$. It can be seen that the resistivity of the $Mn_{1.5}Cr_{1.5}O_4$ pellet is orders of magnitude less than that of $Cr_2O_3$ at all temperatures tested. For example, at 800° C., the resistivity of $Mn_{1.5}Cr_{1.5}O_4$ is 4.0 Ωcm while that of $Cr_2O_3$ is $1.3 \times 10^4$ Ωcm. It is clear from this data that the preferred oxide is $Mn_{1.5}Cr_{1.5}O_4$ and not $Cr_2O_3$.

In accordance with one preferred embodiment, the solid oxide fuel cell interconnect structure of this invention further comprises a second metal layer disposed between the metal layer and the superalloy metallic layer, the second metal layer comprising an additional metal, which additional metal does not oxidize in a fuel atmosphere. In accordance with this embodiment of the solid oxide fuel cell interconnect structure of this invention, the anode facing face of the superalloy is first coated with a metal which does not oxidize in a fuel atmosphere and then coated with a metal which reacts with chromia to form an oxide phase.

We have found that by first applying a layer of certain metals to a superalloy interconnect structure on a side of the superalloy interconnect structure facing the anode of a fuel cell, we are able to prevent oxidation of the interconnect structure on the side of the interconnect structure facing the anode (the fuel side of the interconnect structure). In particular, the metal layer comprises a metal which is not significantly oxidized in the fuel atmosphere of the anode side in a solid oxide fuel cell stack. In accordance with one preferred embodiment of this invention, the metal is selected from the group consisting of nickel, copper, iron, silver, gold, platinum, palladium, iridium, and rhodium. Due to considerations of cost, nickel and copper are particularly preferred metals with copper being preferred over nickel due to the fact that it is more "noble," that is, it oxidizes less than nickel in the fuel atmosphere of the solid oxide fuel cell.

The thicknesses of the superalloy and nickel or copper coating are $t_S, t_{Ni}$ (or $t_{Cu}$), respectively. In accordance with a particularly preferred embodiment of this invention, the thickness of the nickel or copper layer is in the range of about 5 microns to about 100 microns. However, any thickness of nickel or copper which insures that metallic interdiffusion does not occur over the service life of the fuel cell, which could otherwise cause the migration of chromium to the anode side of the fuel cell stack, is acceptable. We believe that at relatively low temperatures, such as below about 800° C., and preferably around 650° C., metallic interdiffusion is all but frozen. However, such is not the case above about 800° C.

Although application of a metal which does not oxidize in a fuel atmosphere to the anode facing face of the superalloy metallic layer reduces the formation of chromia scale on the surface of the superalloy metallic layer, their effectiveness depends upon the diffusion coefficient of chromium through these elements. Experiments have shown that during the course of the experiments, chromium diffuses through the coating (Cu, Ni, etc.) and comes in contact with wet hydrogen and does oxidize. Thus, the coating provides only partial protection. This protection is expected to be greater at lower temperatures. The rationale for the deposition of a metal layer on top of the non-oxidizing metal layer is to facilitate formation of a metal chromite which has a much lower resistivity than chromia. In this manner, the inner Ni or Cu coating slows down the transport of chromium, and whatever chromium does come to the surface, reacts with the metal in the additional metal layer and water from hydrogen to form a coating of a metal chromite. In accordance with a particularly preferred embodiment of this invention, the metal of this metal layer is manganese.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A solid oxide fuel cell interconnector comprising:
    a superalloy metallic layer having an anode facing face and a cathode facing face; and
    a metal layer on said anode facing face of said superalloy metallic layer, said metal layer comprising a metal which reacts with $Cr_2O_3$ to form an electronically conducting oxide phase on said superalloy metallic layer.

2. A solid oxide fuel cell interconnector in accordance with claim 1, wherein said metal is selected from the group consisting of manganese, magnesium, and zinc.

3. A solid oxide fuel cell interconnector in accordance with claim 2, wherein said metal is manganese.

4. A solid oxide fuel cell interconnector in accordance with claim 1, wherein said superalloy is selected from the group consisting of austenitic stainless steel, alloys of nickel and chromium, nickel-based alloys, and cobalt-based alloys.

5. A solid oxide fuel cell interconnector in accordance with claim 1, wherein said metal layer is sufficiently thick so as to prevent metallic interdiffusion under cell operating conditions.

6. A solid oxide fuel cell interconnector in accordance with claim 5, wherein said metal layer has a thickness in a range of about 5 Å to about 10 microns.

7. A solid oxide fuel cell interconnector in accordance with claim 1 further comprising a second metal layer between said metal layer and said superalloy metallic layer, said second metal layer comprising an additional metal, which said additional metal does not oxidize in a fuel atmosphere.

8. A solid oxide fuel cell interconnector in accordance with claim 7, wherein said additional metal is selected from the group consisting of copper, iron, nickel, silver, gold, platinum, palladium, iridium, and rhodium.

9. A solid oxide fuel cell interconnector in accordance with claim 8, wherein said additional metal is nickel.

10. A solid oxide fuel cell interconnector in accordance with claim 8, wherein said additional metal is copper.

11. A solid oxide fuel cell interconnector in accordance with claim 8, wherein said second metal layer has a thickness in a range of about 25 microns to about 125 microns.

12. In a solid oxide fuel cell stack comprising a plurality of fuel cell units, each said fuel cell unit comprising an anode, a cathode, and an electrolyte separating said anode from said cathode, and an interconnect structure separating said anode of one of said fuel cell units from said cathode of an adjacent said fuel cell unit, the improvement comprising:

said interconnect structure comprising a superalloy metallic layer and a metal layer on an anode facing face, said metal layer comprising a metal which reacts with $Cr_2O_3$ to form an electronically conducting oxide phase on said superalloy metallic layer.

13. A solid oxide fuel cell stack in accordance with claim 12, wherein said metal is selected from the group consisting of manganese, magnesium, and zinc.

14. A solid oxide fuel cell stack in accordance with claim 13, wherein said metal is manganese.

15. A solid oxide fuel cell stack in accordance with claim 12, wherein said superalloy is selected from the group consisting of austenitic stainless steel, alloys of nickel and chromium, nickel-based alloys, and cobalt-based alloys.

16. A solid oxide fuel cell stack in accordance with claim 12, wherein said metal layer is sufficiently thick so as to prevent metallic interdiffusion under cell operating conditions.

17. A solid oxide fuel cell stack in accordance with claim 16, wherein said metal layer has a thickness in a range of about 5 Å to about 10 microns.

18. A solid oxide fuel cell stack in accordance with claim 13, wherein said interconnect structure further comprises a second metal layer between said metal layer and said superalloy metallic layer, said second metal layer comprising an additional metal, which said additional metal does not oxidize in a fuel atmosphere.

19. A solid oxide fuel cell stack in accordance with claim 18, wherein said additional metal is selected from the group consisting of copper, iron, nickel, silver, gold, platinum, palladium, iridium, and rhodium.

20. A solid oxide fuel cell stack in accordance with claim 19, wherein said additional metal is nickel.

21. A solid oxide fuel cell stack in accordance with claim 19, wherein said additional metal is copper.

22. A solid oxide fuel cell stack in accordance with claim 19, wherein said second metal layer has a thickness in a range of about 25 microns to about 125 microns.

* * * * *